United States Patent
Lin et al.

(10) Patent No.: US 10,013,520 B2
(45) Date of Patent: Jul. 3, 2018

(54) METHOD OF DETERMINING IF LAYOUT DESIGN IS N-COLORABLE

(71) Applicant: TAIWAN SEMICONDUCTOR MANUFACTURING COMPANY, LTD., Hsinchu (TW)

(72) Inventors: Hung Lung Lin, Hsinchu (TW); Chin-Chang Hsu, Banqiao (TW); Chien Lin Ho, Taichung (TW); Wen-Ju Yang, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 69 days.

(21) Appl. No.: 14/045,532

(22) Filed: Oct. 3, 2013

(65) Prior Publication Data

US 2015/0100935 A1    Apr. 9, 2015

(51) Int. Cl.
*G06F 17/50*    (2006.01)

(52) U.S. Cl.
CPC ...... *G06F 17/5081* (2013.01); *G06F 2217/12* (2013.01); *Y02P 90/265* (2015.11)

(58) Field of Classification Search
CPC .......................... G06F 17/5081; G06F 2217/12
See application file for complete search history.

(56) References Cited

U.S. PATENT DOCUMENTS

| | | | | |
|---|---|---|---|---|
| 2005/0039175 | A1* | 2/2005 | Tatge et al. | 717/156 |
| 2009/0125866 | A1* | 5/2009 | Wang | G03F 7/70466 716/50 |
| 2012/0137261 | A1* | 5/2012 | Ban | G06F 17/5068 716/52 |
| 2013/0145340 | A1* | 6/2013 | Li | G06F 17/5045 716/136 |
| 2014/0065728 | A1* | 3/2014 | Agarwal et al. | 438/4 |
| 2014/0237436 | A1* | 8/2014 | Li | G06F 17/5068 716/55 |
| 2014/0245237 | A1* | 8/2014 | Cilingir | G03F 7/70433 716/51 |
| 2015/0052490 | A1* | 2/2015 | Cilingir et al. | 716/52 |

OTHER PUBLICATIONS

Tian et al., "A Polynomial Time Triple Patterning Algorithm for Cell Based Row-Structure Layout". IEEE/ACM International Conference on Computer-Aided Design (ICCAD) 2012, pp. 57-64. Nov. 2012.*

* cited by examiner

*Primary Examiner* — Vuthe Siek
*Assistant Examiner* — Aric Lin
(74) *Attorney, Agent, or Firm* — Hauptman Ham, LLP

(57) ABSTRACT

A method of determining if a layout design for fabricating a layer of features of an integrated circuit is N-colorable, comprising identifying a set of candidate cells among layout cells of a layout design. Each candidate cell of the set of candidate cells is one of the set of base layout cells, or one of the set of composite layout cells, and constituent layout cells of the one of the set of composite layout cells having been determined as N-colorable. Whether a first candidate cell of the set of candidate cell is N-colorable is determined. An abutment-sensitive conflict graph of the first candidate cell is generated when the first candidate cell is N-colorable and the first candidate cell is not the top layout cell.

21 Claims, 11 Drawing Sheets

US 10,013,520 B2

METHOD OF DETERMINING IF LAYOUT DESIGN IS N-COLORABLE

BACKGROUND

In semiconductor fabrication processes, a single layer of features is sometimes formed by using multiple-exposure or multiple-patterning technology to improve a spatial resolution of the layer. For example, if a layer of features is to be fabricated using N exposure or patterning processes (i.e., N-exposure or N-patterning), N being a positive integer no less than 2, layout patterns corresponding to a layout design for the layer of features are assigned to N different groups for corresponding exposure or patterning processes. The pattern-assigning process is sometimes performed in a manner similar to resolving a coloring problem under graph theory. Therefore, the pattern-assigning process is sometimes referred to as a "coloring process," and a layout design is sometimes referred to as "N-colorable" if layout patterns of the layout design are capable of being assigned to N different patterning groups. Performance of a pattern-assigning process for a layout design is usually computational resource demanding and time consuming.

DESCRIPTION OF THE DRAWINGS

One or more embodiments are illustrated by way of example, and not by limitation, in the figures of the accompanying drawings, wherein elements having the same reference numeral designations represent like elements.

DETAILED DESCRIPTION

Figure 1A:
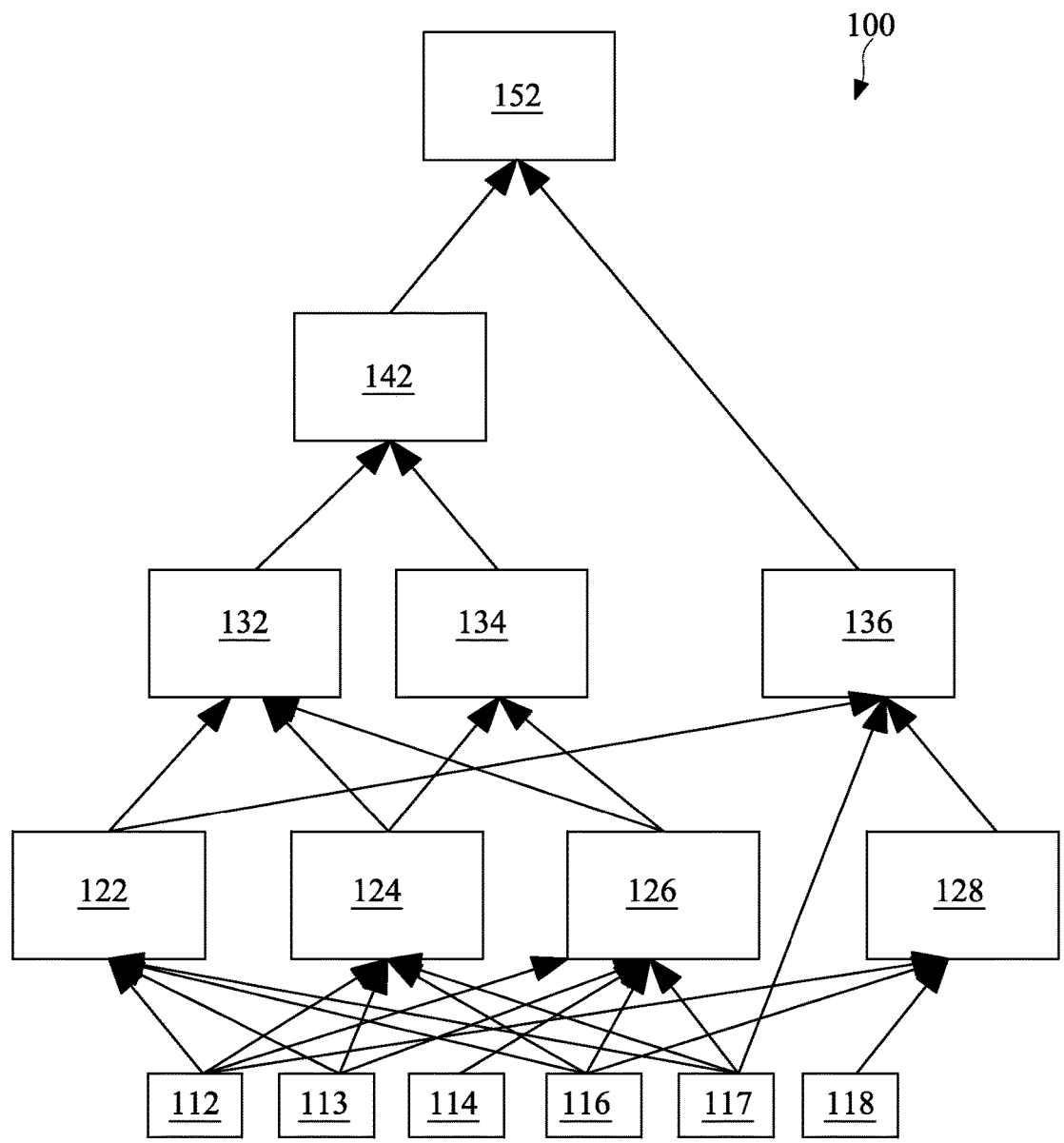
FIG. 1A is a tree diagram of a layout design in accordance with one or more embodiments.

It is understood that the following disclosure provides one or more different embodiments, or examples, for implementing different features of the disclosure. Specific examples of components and arrangements are described below to simplify the present disclosure. These are, of course, examples and are not intended to be limiting. In accordance with the standard practice in the industry, various features in the drawings are not drawn to scale and are used for illustration purposes only.

Moreover, spatially relative terms, for example, "lower," "upper," "horizontal," "vertical," "above," "below," "up," "down," "top," "bottom," "left," "right," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

In many applications, an integrated circuit includes a combination of various circuit blocks. Each of the circuit blocks is also a combination of other circuit blocks. Therefore, in some embodiments, an integrated circuit includes various circuit blocks arranged in a hierarchical manner. In some applications, a set of pre-designed circuit blocks provided by a semiconductor fabrication company is usually referred to as standard cells suitable to be fabricated by a predetermined fabrication process. In some embodiments, a layout design usable for fabricating a layer of features of the integrated circuit is also organized by a circuit designer or a layout engineer as layout cells of corresponding circuit blocks and is also arranged in a hierarchical manner.

To determine if a layout design for fabricating a layer of features of an integrated circuit is N-colorable, in some embodiments, an analysis process is repetitively performed on individual layout cells in an iterative manner. In some embodiments, layout cells at a lower level of the hierarchy are analyzed, and then abutment-sensitive information of the lower level layout cells are made available to a layout cell at an upper level of the hierarchy. Therefore, instead of analyzing all layout patterns of the layout design at the same time, the determination of whether the layout design is N-colorable in some embodiments is divided into multiple iterations of smaller analysis processes. In some embodiments, a computational complexity and a computational time for analyzing a layout design performed based on at least one embodiment of the present application are less than those of an analysis performed on all layout patterns of the layout design at the same time.

Throughout the present disclosure, N is set to be three (3) as an example. The disclosed subject matter is also applicable to other N-coloring problems where N is two (2) or greater than three.

Hierarchical Design of Integrated Circuit

FIG. 1A is a tree diagram 100 of a layout design in accordance with one or more embodiments. The layout design is usable for fabricating a layer of features of an integrated circuit. In view of the hierarchical design of the integrated circuit, the layout design also includes layout cells 112, 113, 114, 116, 117, 118, 122, 124, 126, 128, 132, 134, 136, 142, and 152 that correspond to various levels and types of circuit blocks and are arranged in a hierarchical manner.

The layout cells of the layout design include a set of base layout cells 112, 113, 114, 116, 117, and 118 and set of composite layout cells 122, 124, 126, 128, 132, 134, 136, 142, and 152. In some embodiments, base layout cells 112, 113, 114, 116, 117, and 118 correspond to standard cells pre-designed by an integrated circuit fabrication company based on a predetermined fabrication process. For example, base layout cells 112, 113, 114, 116, 117, and 118 are for standard cells including AND, NAND, OR, NOR, NOT, BUFFER cells, etc.

In some embodiments, base layout cells 112, 113, 114, 116, 117, and 118 correspond to smallest layout blocks in an integrated circuit designing system, such as a computer executing a place-and-route software program. In some embodiments, the set of composite layout cells corresponding to various circuit blocks that a circuit designer defines for facilitating a circuit designing process.

Figure 1B:
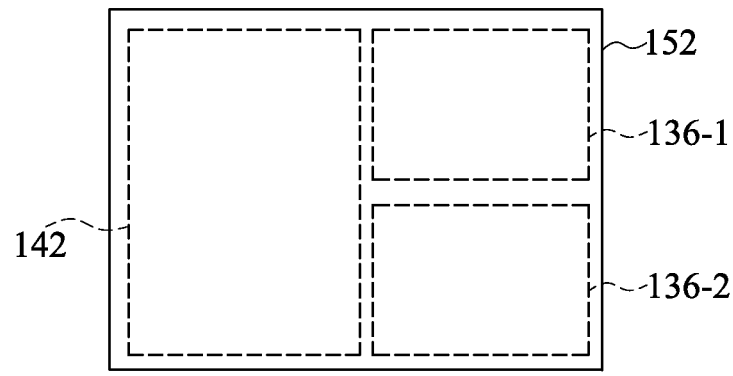
FIGS. 1B and 1C are diagrams of top layout cell 152 and constituent layout cells thereof at various hierarchical levels in accordance with one or more embodiments.
Figure 1C:
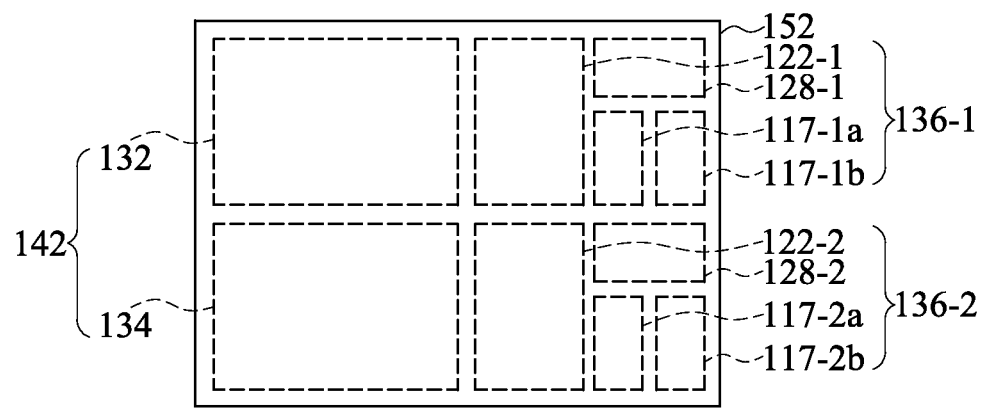

For example, the set of composite layout cells includes a top layout cell 152 that is usable to represent the entire layout design. FIG. 1B is a diagram of top layout cell 152 and constituent layout cells thereof in accordance with one or more embodiments. A constituent layout cell of an upper level cell is a layout cell to which the upper level cell directly refers to as a building block of the upper level cell. In the present example, top layout cell 152 is a combination of layout cell 142 and two layout cells 136 (136-1 and 136-2), and layout cells 142, 136-1, and 136-2 are constituent layout cells of top layout cell 152. FIG. 1C is a diagram of layout cell 152 and constituent layout cells of layout cells 142, 136-1, and 136-2 in accordance with one or more embodiments. Layout cell 142 is a combination of layout cells 132 and 134. Layout cell 136-1 is a combination of layout cells 122 (122-1) and 128 (128-1) and base layout cells 117 (117-1a and 117-1b), and thus layout cells 122-1, 128-1, 117-1a, and 117-1b are constituent layout cells of layout cell 136-1. Layout cell 136-2 is a combination of layout cells 122 (122-2) and 128 (128-2) and base layout cells 117 (117-2a and 117-2b), and thus layout cells 122-2, 128-2, 117-2a, and 117-2b are constituent layout cells of layout cell 136-2.

Moreover, as depicted in FIG. 1A, layout cell 132 is a combination of layout cells 122, 124, and 126; layout cell 134 is a combination of layout cells 124 and 126; layout cell 122 is a combination of base layout cells 112, 113, 116, and 117; layout cell 124 is another combination of base layout cells 112, 113, 116, and 117, layout cell 126 is a combination of base layout cells 112, 113, 114, 116, and 117; and layout cell 128 is a combination of base layout cells 112, 116, and 118.

In some embodiments, composite layout cells 122, 124, 126, 128, 132, 134, 136, 142, and 152 correspond to circuit blocks including memory array, controller, input/output unit, or any circuit block that is suitable to be individually verified and repetitively used in an integrated circuit design.

Conflict Graph of Base Layout Cell

Figure 2A:
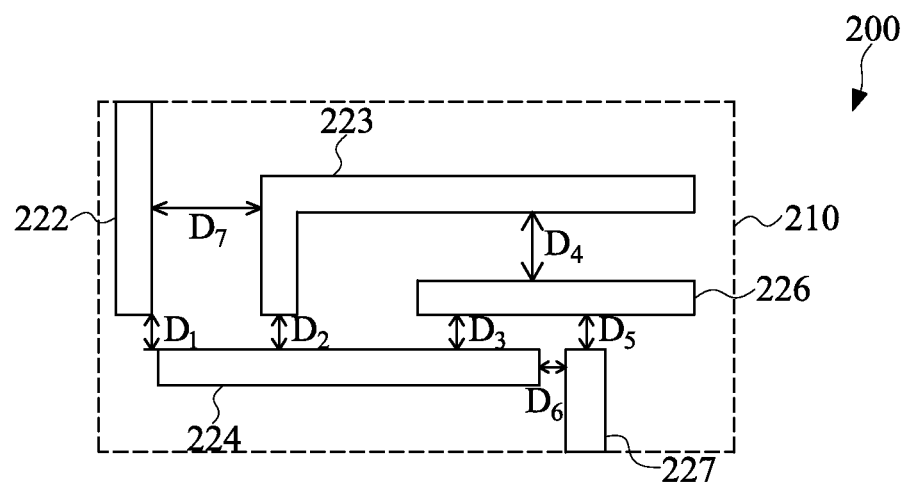
FIG. 2A is a diagram of an example base layout cell in accordance with one or more embodiments.

FIG. 2A is a diagram of an example base layout cell 200 in accordance with one or more embodiments. In some embodiments, layout cell 200 is usable as one of base layout cells 112, 113, 114, 116, 117, and 118 depicted in FIG. 1. Layout cell 200 includes a cell boundary 210 and layout patterns 222, 223, 224, 226, and 227. In the present example, a distance D1 between layout patterns 222 and 224, a distance D2 between layout patterns 223 and 224, a distance D3 between layout patterns 224 and 226, a distance D4 between layout patterns 223 and 226, a distance D5 between layout patterns 226 and 227, and a distance D6 between layout patterns 224 and 227 are less than a predetermined threshold distance, which is sometimes referred to as "G0-distance." In order to properly fabricate the features represented by layout design 200, layout patterns having a distance less than the G0-distance are assigned to different patterning groups. Meanwhile, in the present example, a distance D7 between layout patterns 222 and 223 is greater than the G0-distance. Therefore, layout patterns 222 and 223 are capable of being assigned to the same of different patterning groups.

Figure 2B:
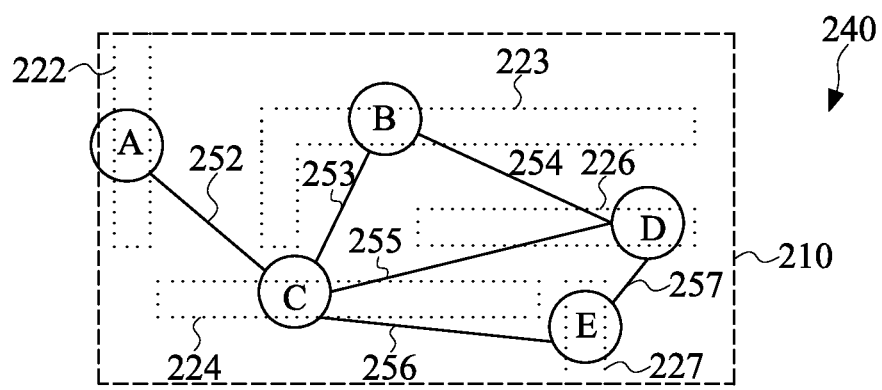
FIG. 2B is a conflict graph of the example base layout cell of FIG. 3A in accordance with one or more embodiments.

FIG. 2B is a conflict graph 240 of the example base layout cell 200 of FIG. 2A in accordance with one or more embodiments. Converting a layout cell into a corresponding conflict graph includes assigning vertices or nodes each representing a layout cell and connecting two vertices with an edge when the distance therebetween is less than the G0-distance. For example, layout patterns 222, 223, 224, 226, and 227 are variously represented by vertices or nodes A, B, C, D, and E. Vertices A and C are connected by an edge 252, because distance D1 is less than the G0-distance. Similarly, vertices B and C, B and D, C and D, C and E, and D and E are connected by edges 253, 254, 255, 256, and 257. Vertices A and B are not connected by any edge, because distance D7 is greater than the G0-distance. Thereafter, a pattern-assigning process for layout pattern 200 is converted into resolving a coloring problem for conflict graph 240.

Abutment-Sensitive Conflict Graph

For a layout cell, such as a base layout cell 112, 113, 114, 116, 117, or 118 or a composite layout cell 122, 124, 126, 128, 132, 134, 136, 142, or 152, a corresponding abutment-sensitive conflict graph is derived and made available to another layout cell having a higher hierarchical level, if any. In some embodiments, the abutment-sensitive conflict graph includes vertices that are related to forming an edge with an adjacent layout cell in a conflict graph of a higher hierarchical level. Thus, the amount of information processed by the higher hierarchical level is reduced.

Figure 3A:
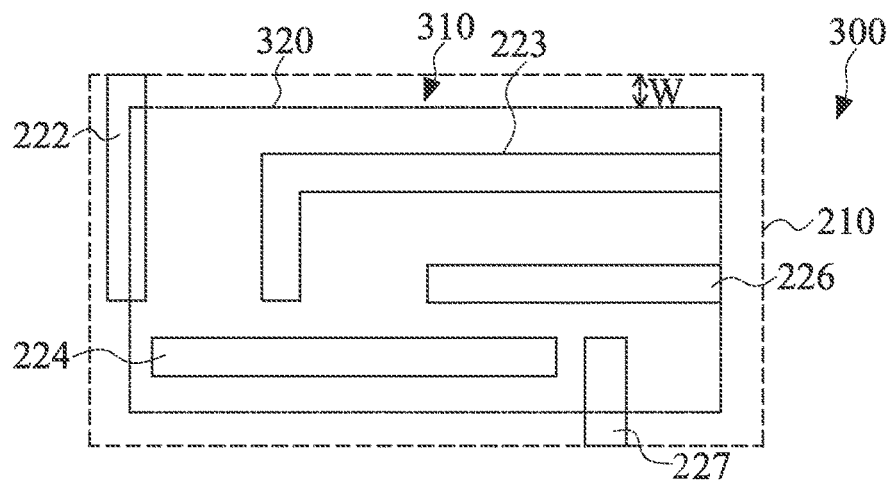
FIG. 3A is a diagram of an example base layout cell having an abutment-sensitive region defined therein in accordance with one or more embodiments.

FIG. 3A is a diagram of an example base layout cell 300 having an abutment-sensitive region 310 defined therein in accordance with one or more embodiments. For illustration purposes, example base layout cell 300 depicted in FIG. 3A has a similar configuration as layout cell 200 depicted in FIG. 2A. Components of layout cell 300 similar to those of layout cell 200 are given the same reference numbers. Also, layout cell 300 has a conflict graph similar to that depicted in FIG. 2B.

Abutment-sensitive region 310 is defined as a region between cell boundary 210 and blockage boundary 320. A layout pattern falling within the abutment-sensitive region 310 is capable of having a distance less than the G0-distance with another layout pattern of an adjacent layout cell. In some embodiments, if a layout pattern is away from cell boundary 210 for a distance greater than the G0-distance and/or a predetermined shift of layout cells, the layout pattern is unlikely to have a distance less than the G0-distance with any layout cell of an adjacent layout cell.

In some embodiments, blockage boundary 320 is formed by moving cell boundary 310 inwardly for a predetermined distance W. In some embodiments, the predetermined distance W is equal to or greater than the predetermined threshold distance (i.e., the G0-distance) and a predetermined cell-overlapping allowance. As illustrated above, a vertex, such as a vertex representing a layout pattern 223, 224, or 226, inside blockage boundary 320 does not form an additional edge with a vertex representing a layout pattern of an adjacent layout cell. Also, a vertex representing a layout pattern, such as layout pattern 222 or 227 that at least partially falls in abutment-sensitive region 310, will be presented in the abutment-sensitive conflict graph.

Figure 3B:
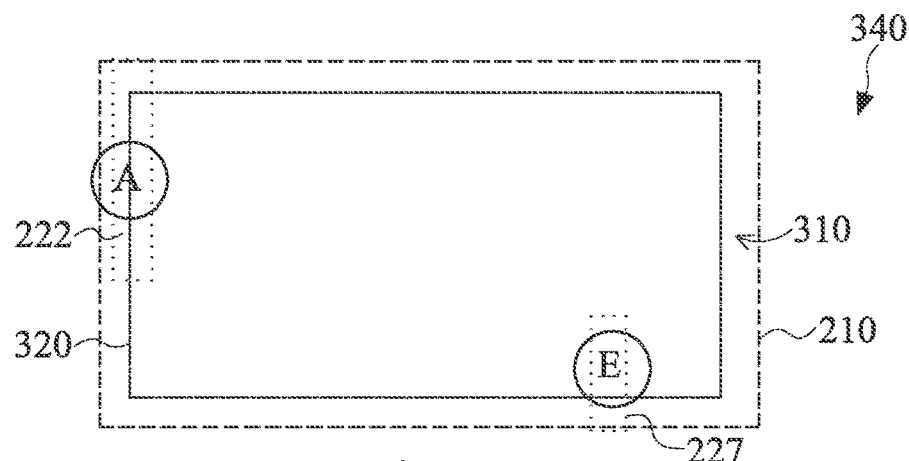
FIG. 3B is an abutment-sensitive conflict graph of the example base layout cell of FIG. 3A in accordance with one or more embodiments.

FIG. 3B is an abutment-sensitive conflict graph 340 of the example base layout cell of FIG. 3A in accordance with one or more embodiments. In abutment-sensitive conflict graph 340, vertices A and E corresponding to layout patterns 222 and 227 are presented, because layout patterns 222 and 227 partially fall into abutment-sensitive region 310. As depicted in FIG. 2B, if N is set to three, because vertices A and E are capable of being assigned to the same or different colors, no limitation is to be imposed to the coloring of vertices A and E in the abutment-sensitive conflict graph. Thus, in FIG. 3B, no edge or link needs to be added to connect vertices A and E.

Figure 3C:
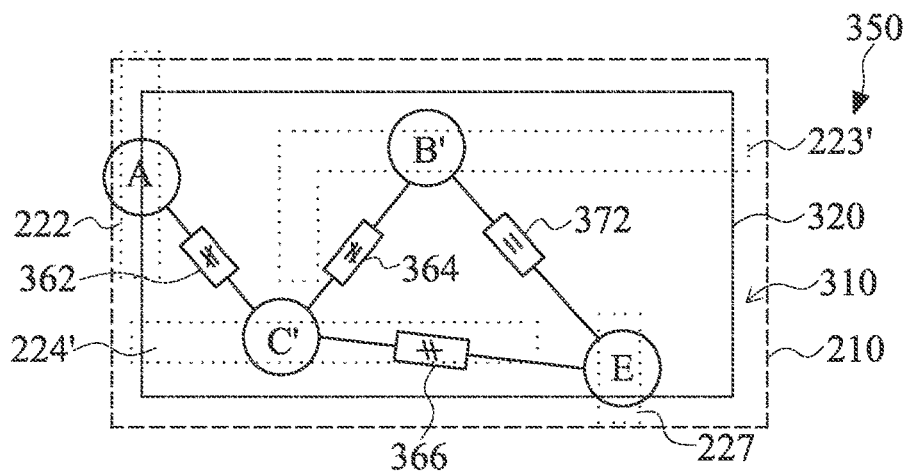
FIG. 3C is an abutment-sensitive conflict graph of another example base layout in accordance with one or more embodiments.

FIG. 3C is an abutment-sensitive conflict graph 350 of another example base layout in accordance with one or more embodiments. Abutment-sensitive conflict graph 350 is for a cell similar to layout cell 300, except layout pattern 223 is shifted to the right of the page to become layout pattern 223' and 224 is shifted to the left of the page to become layout pattern 224'. Layout patterns 223' and 224' are still within layout cell boundary 210 and partially fall into abutment-sensitive region 310. Vertices A, B', C' and E, which correspond to layout patterns 222, 223', 224', and 227 are presented in abutment-sensitive conflict graph 350. The coloring of vertices A, B', C', and E is still consistent with vertices A, B, C, and E depicted in the conflict graph 240.

In addition, as depicted in FIGS. 2B and 3C, the colors usable to be assigned vertices A, B', C', and E are interrelated, and thus the interrelation of coloring of vertices A, B', C' and E is also presented in abutment-sensitive conflict graph 350. In some embodiments, two vertices are connected by a first type edge being referred to as a "same-color link" when the two vertices are capable of being assigned to a same color. In some embodiments, two vertices are connected by a second type edge being referred to as a "different-color link" when the two vertices are capable of being assigned to different colors. For example, in view of the conflict graph 350, vertices A and C' are connected by a different-color link 362 because vertices A and C' are capable of being assigned to different colors. For a similar reason, vertices B' and C' are connected by a different-color link 364, and vertices C' and E' are connected by a different-color link 366. Also, in a 3-coloring process, vertices B' and E will be assigned the same color, and thus vertices B' and E are connected by a same-color link 372.

In some embodiments, an abutment-sensitive conflict graph 350 prepared according to the processes illustrated in conjunction with FIGS. 3A-3C omits certain details inside blockage boundary 320. As a result, in some embodiments, not all possible coloring results (i.e., an entire solution space) of the layout cell corresponding to the abutment-sensitive conflict graph are incorporated in the abutment-sensitive conflict graph.

Figure 4A:
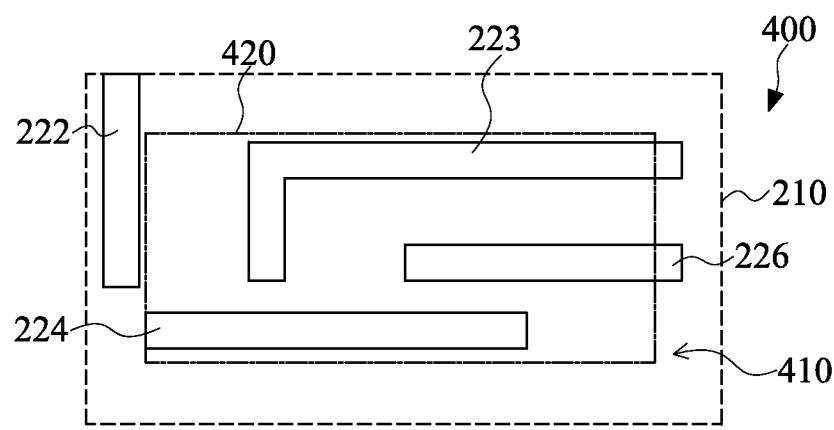
FIG. 4A is a diagram of an example base layout cell having an abutment-sensitive region defined therein in accordance with one or more embodiments.

For example, FIG. 4A is a diagram of an example base layout cell 400 having an abutment-sensitive region 410 defined therein in accordance with one or more embodiments. For illustration purposes, example base layout cell 400 depicted in FIG. 4A has a similar configuration as layout cell 200 depicted in FIG. 2A, except layout pattern 227 is not present in layout cell 400. Components of layout cell 400 similar to those of layout cell 200 are given the same reference numbers. A blockage boundary 420 inside the layout cell, and the abutment-sensitive region 410 is defined as a region between cell boundary 210 and blockage boundary 420. Layout patterns 222, 223, and 226 are at least partially falling within abutment-sensitive region 410, and layout pattern 224 is inside blockage boundary 420.

Figure 4B:
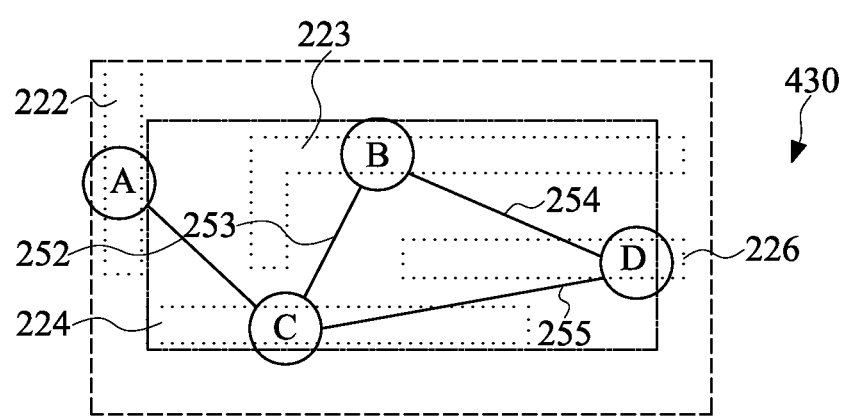
FIG. 4B is a conflict graph of the example base layout cell of FIG. 3A in accordance with one or more embodiments.

FIG. 4B is a conflict graph 430 of the example base layout cell 400 of FIG. 4A in accordance with one or more embodiments. In conflict graph 430, following the processes similar to those illustrated in conjunction with FIGS. 2A and 2B, layout patterns 222, 223, 224, and 226 are respectively represented by vertices A, B, C, and D. Vertices A and C, B and C, B and D, and C and D are respectively connected by edges 252, 253, 254, and 255.

Figure 4C:
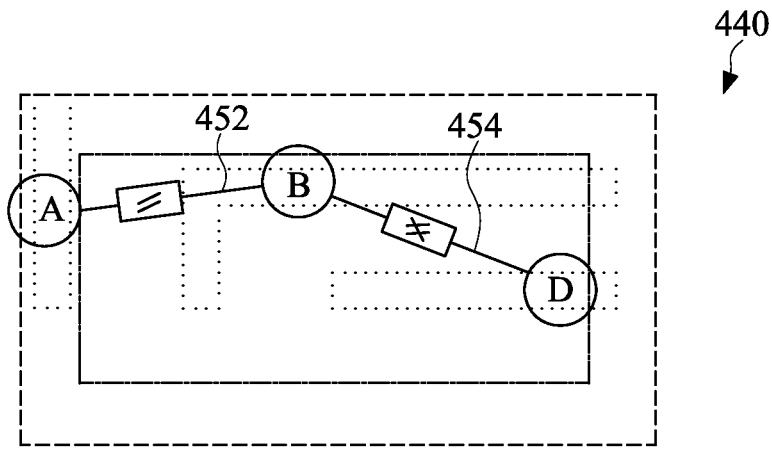
FIGS. 4C-4D are various abutment-sensitive conflict graphs of the example base layout cell of FIG. 4A in accordance with one or more embodiments.

FIG. 4C is an abutment-sensitive conflict graph 440 of the example base layout cell 400 of FIG. 4A in accordance with one or more embodiments. Based on a method described in conjunction with FIGS. 3A-3C, conflict graph 430 is further simplified into abutment-sensitive conflict graph 440. As depicted in FIG. 4C, vertices A and B are connected by a same-color link 452 because vertices A and B are capable of being assigned the same color, and vertices B and D are connected by a different-color link 454 because vertices B and D are capable of being assigned different colors.

Figure 4D:
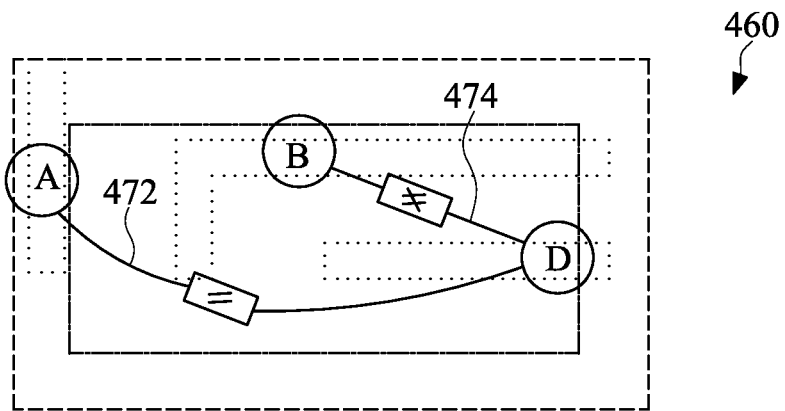

FIG. 4D is another abutment-sensitive conflict graph 460 of the example base layout cell 400 of FIG. 4A in accordance with one or more embodiments. Based on a method described in conjunction with FIGS. 4A-4C, conflict graph 430 is also capable of being simplified into abutment-sensitive conflict graph 460. As depicted in FIG. 4D, vertices A and D are connected by a same-color link 472 because vertices A and D are capable of being assigned the same color, and vertices B and D are connected by a different-color link 474 because vertices B and D are capable of being assigned different colors.

However, in the example illustrated in conjunction with FIGS. 4C-4D for performing a 3-coloring process, vertex A cannot be both assigned the same color as vertices B and D, because vertices B and D have to be assigned different colors. Therefore, in at least one embodiment, each of abutment-sensitive conflict graphs 440 and 460 represents a non-overlapped portion of solution space of conflict graph 430.

Figure 4E:
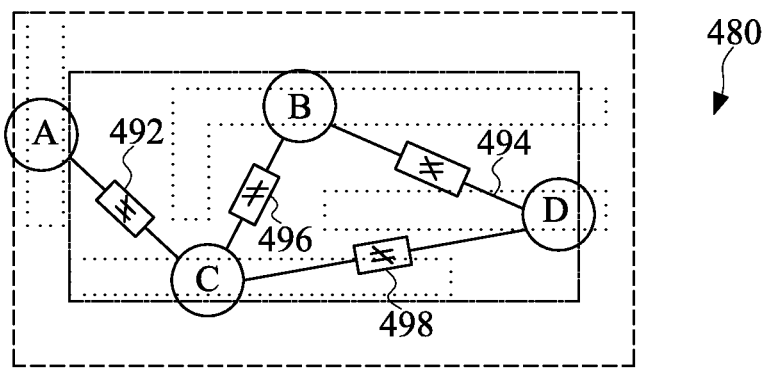
FIG. 4E is a modified abutment-sensitive conflict graph of the example base layout cell of FIG. 4A in accordance with one or more embodiments.

FIG. 4E is a modified abutment-sensitive conflict graph 480 of the example base layout cell 400 of FIG. 4A in accordance with one or more embodiments. In at least another embodiment, a modified abutment-sensitive conflict graph 480 is derived from abutment-sensitive conflict graph 440 or 460 in order to include the entire solution space of conflict graph 430. For example, a connecting vertex, such as vertex C, is added back to the abutment-sensitive conflict graph 480 even when vertex C corresponds to a layout pattern 224 inside blockage boundary 420. In view of the conflict graph 430, vertices A, B, D, and the added connecting vertex C are connected by either same-color links or different-color links. In the embodiment depicted in FIG. 4E, vertices A and C, vertices B and D, vertices B and C, and vertices C and D are pairs of vertices linked by edges 252, 254, 253, and 255, respectively, and thus should be assigned different colors. Therefore, vertices A and C are connected by a different-color link 492, vertices B and D are connected by a different-color link 494, vertices B and C are connected by a different-color link 496, and vertices C and D are connected by a different-color link 498.

Combine Abutment-Sensitive Conflict Graphs

For a composite layout cell, such as layout cells 122, 124, 126, 128, 132, 134, 136, 142, or 152 in FIG. 1, a conflict graph thereof is prepared based on combining abutment-sensitive conflict graphs of constituent layout cells of the composite layout cell. An example process of creating a conflict graph (e.g., conflict graph 540 in FIG. 5C) by combining abutment-sensitive conflict graphs (e.g., conflict graph 510 in FIG. 5A and conflict graph 530 in FIG. 5B) of constituent layout cells will be further explained in detail in conjunction with FIGS. 5A-5C.

Figure 5A:
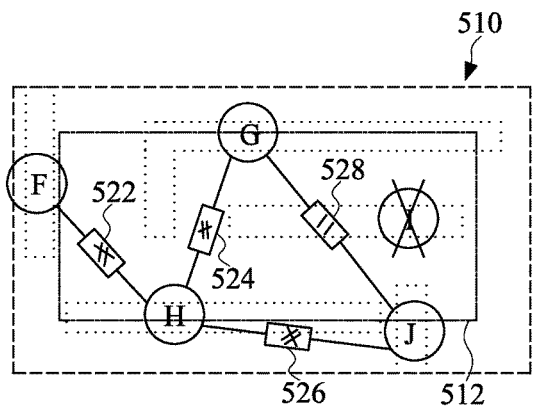
FIGS. 5A and 5B are abutment-sensitive conflict graphs of two base layout cells in accordance with one or more embodiments.
Figure 5B:
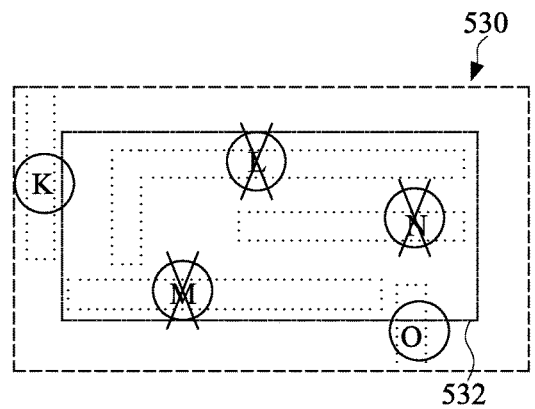

FIGS. 5A and 5B are abutment-sensitive conflict graphs 510 and 530 of two base layout cells in accordance with one or more embodiments. Abutment-sensitive conflict graphs 510 and 530 are only presented as non-limiting examples for illustrating combining multiple abutment-sensitive conflict graphs. Abutment-sensitive conflict graph 510 corresponds to a first type of layout cell and is derived in a manner similar to the example illustrated in conjunction with FIGS. 3A and 3C. Abutment-sensitive conflict graph 310 has vertices F, G, H and J connected by different-color links 522, 524, and 526. Abutment-sensitive conflict graph 510 has vertices G and J connected by a same-color link 528. Vertex I is not included in abutment-sensitive conflict graph 510 and marked by a cross sign, because vertex I in this example corresponds to a layout pattern inside blockage boundary 512. Also, abutment-sensitive conflict graph 530 corresponds to a second type of layout cell and is derived in a manner similar to the example illustrated in conjunction with FIGS. 3A and 3B. Abutment-sensitive conflict graph 530 has vertices K and O, and vertices L, M, and N are not included in abutment-sensitive conflict graph 530 and are marked by cross signs, because vertices L, M, and N in this example correspond to layout patterns inside the corresponding blockage boundary 532.

Figure 5C:
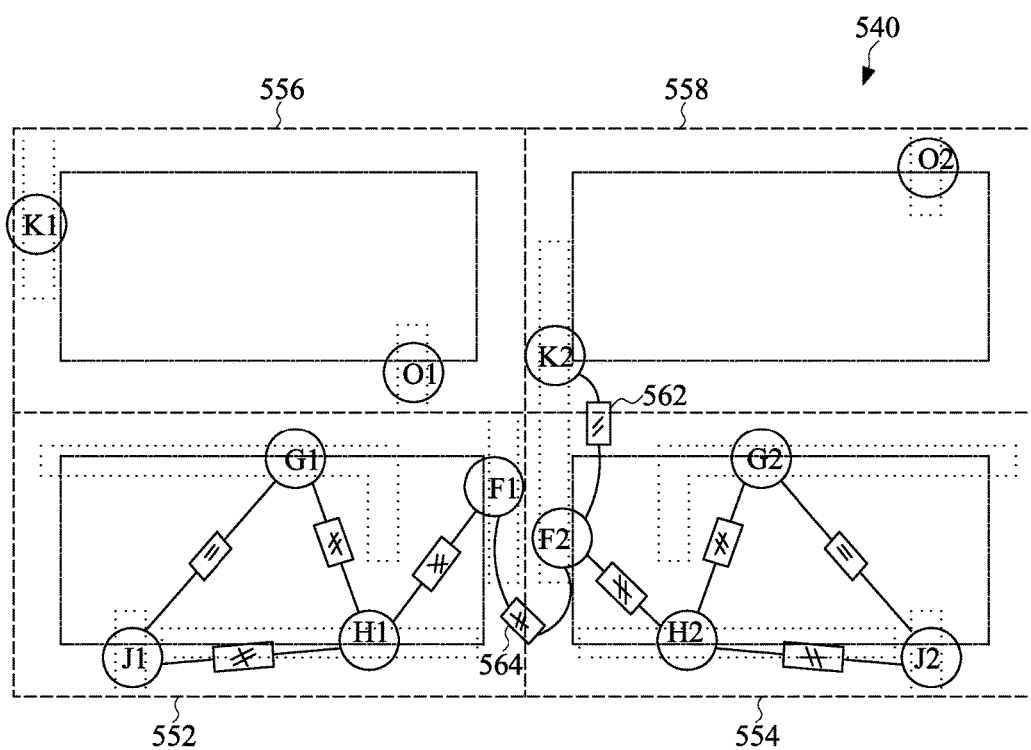
FIG. 5C is an abutment-sensitive conflict graph of a composite layout cell in accordance with one or more embodiments.

FIG. 5C is an abutment-sensitive conflict graph 540 of a composite layout cell in accordance with one or more embodiments. In at least one embodiment, the composite layout cell has two first type cells 552 and 554 and two second type cells 556 and 558. For example, abutment-sensitive conflict graph of cell 552 has vertices F1, G1, H1, and J1 connected in a manner similar to vertices F, G, H, and J depicted in FIG. 5A. Abutment-sensitive conflict graph of cell 554 has vertices F2, G2, H2, and J2 connected in a manner similar to vertices F, G, H, and J depicted in FIG. 5A. Abutment-sensitive conflict graph of cell 556 has vertices K1 and O1 arranged in a manner similar to vertices O and K depicted in FIG. 5B. Abutment-sensitive conflict graph of cell 858 has vertices K2 and O2 arranged in a manner similar to vertices O and K depicted in FIG. 5B. Abutment-sensitive conflict graph 540 is only presented as a non-limiting example for illustrating combining multiple abutment-sensitive conflict graphs.

Furthermore, in some embodiments, same-color links or different-color links are selectively added to connect vertices of adjacent layout cells. For example, in the embodiment depicted in FIG. 5C, because vertices K2 and F2 corresponding to merged layout patterns from cells 554 and 558, vertices K2 and F2 refer to the same layout pattern and thus are connected by a same-color link 562. Also, because vertices F1 and F2 correspond to layout patterns that have a distance less than the G0-distance, vertices F1 and F2 cannot be assigned the same color and are thus connected by a different-color link 564. On the other hand, no same-color link or different-color link is necessary for vertex O1, because vertex O1 is separated from nearby vertices (G1 and K2) by a distance equal to or greater than G0-distance.

Vertex Reduction

In order to simplify conflict graphs of layout cells, such as conflict graph 240 or abutment-sensitive conflict graph 350 or 540, many vertex reduction processes are applicable to determine which vertex is omissible. In some embodiments, a vertex is omissible if coloring of the vertex is independent of coloring of other vertices in the same conflict graph, or if coloring of the vertex is derivable from the coloring result of other vertices in the same conflict graph. In other words, analyses performed with and without omissible vertices have the same conclusion with regard to whether the conflict graph is N-colorable. Therefore, if a conflict graph without an omitted vertex is determined to be N-colorable, a conflict graph with the omitted vertex is also N-colorable.

In some embodiments, a vertex is omissible when the vertex is connected to less than (N−1) vertices (or degrees of connection) in the conflict graph.

Figure 6A:
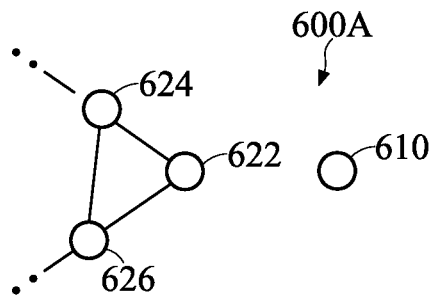
FIGS. 6A-6C are example conflict graphs depicting different degrees of connection in accordance with one or more embodiments.
Figure 6B:
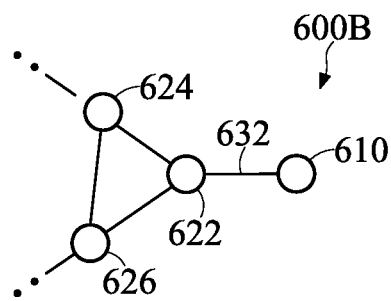
Figure 6C:
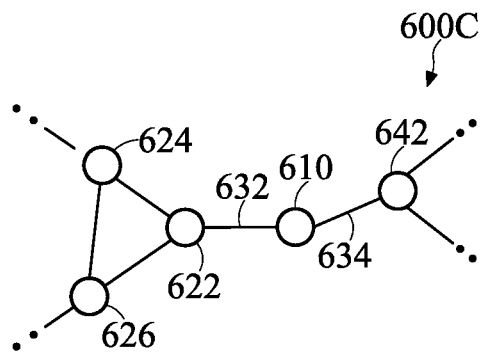

FIGS. 6A-6C are example conflict graphs 600A, 600B, and 600C depicting different degrees of connection in accordance with one or more embodiments, where N is set to be three (3). For illustration purposes, the three colors for coloring the conflict graph are referred to as red (R), green (G), and blue (B). In some embodiments, conflict graph 600A, 600B, or 600C is a portion of a conflict graph of one of layout cells depicted in FIG. 1.

FIG. 6A is a first example conflict graph 600A depicting a vertex 610 having zero degree of connection. Conflict graph 600A has vertices 622, 624, and 626 connected with one another. Conflict graph 600A also has a vertex 610 that does not connect to any of the vertices 622, 624, and 626, and thus is also referred to as having zero degree of connection. In some embodiments, vertex 610 is omissible, because the coloring of vertex 610 is independent of the coloring of other vertices 622, 624, and 626. For example, regardless the coloring result of vertices 622, 624, and 626, vertex 610 is capable of being colored as R, G, or B.

FIG. 6B is a second example conflict graph 600B depicting a vertex 610 having one degree of connection. Conflict graph 600B has vertices 622, 624, and 626 connected with one another. Conflict graph 600B also has a vertex 610 that is connected to vertex 622 through edge 632, and thus is also referred to as having one degree of connection. In some embodiments, vertex 610 is omissible, because the coloring of vertex 610 is capable of being derived once the coloring of other vertices 622, 624, and 626 is determined. For example, after vertex 622 is colored as R, vertex 610 is capable of being colored as G or B without affecting other vertices.

FIG. 6C is a third example conflict graph 600C depicting a vertex 610 having two degrees of connection in accordance with one or more embodiments. Conflict graph 600C has vertices 622, 624, and 626 connected with one another. Conflict graph 600C also has a vertex 610 that is connected to vertex 622 through edge 632 and connected to another vertex 642 through edge 634, and thus is also referred to as having two degrees of connection. In some embodiments, vertex 610 is omissible, because the coloring of vertex 610 is immediately determined once the coloring of other vertices 622, 624, 626, and 642 is determined. For example, after vertex 622 is colored as R, when vertex 642 is colored as R, vertex 610 is capable of being colored as G or B without affecting other vertices. In an alternative example, after vertex 622 is colored as R, when vertex 642 is colored as G, vertex 610 is capable of being colored as B immediately without affecting other vertices.

N-Colorable Analysis—Diamond Reduction

Many processes based on Graph Theory are usable to determine if a conflict graph, such as the conflict graph 240, is N-colorable. In some embodiments, a process referred to as "diamond reduction" is applicable to determine if a conflict graph is N-colorable. Diamond reduction will be further illustrated in conjunction with FIGS. 7A-7D.

Figure 7A:
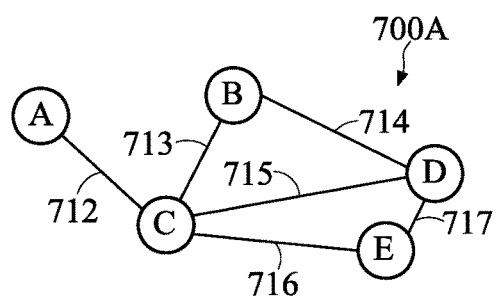
FIG. 7A is a conflict graph in accordance with one or more embodiments.
Figure 7B:
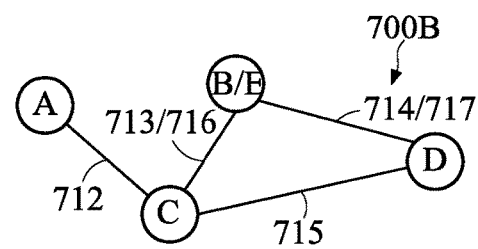
FIG. 7B is a resulting conflict graph after performing diamond reduction on the conflict graph of FIG. 7A in accordance with one or more embodiments.

For example, FIG. 7A is a conflict graph 700A in accordance with one or more embodiments. Conflict graph 700A depicts that vertex A is connected to vertex C by edge 712, vertex B is connected to vertices C by edge 713 and D by edge 714, vertex E is connected to vertex C by edge 716 and vertex D by edge 717, and vertex C is also connected to vertex D by edge 715. Vertices B and E belong to two triangles sharing vertices C and D and edge 715 connecting vertex C and vertex D, and vertices B, C, D, and E together form a diamond shape. Assuming for example that conflict graph 700A is going to be assigned to three different colors, once the colors of vertices C and D are determined, vertices B and E will be colored with the same color. FIG. 7B is a resulting conflict graph 700B after performing diamond reduction on the conflict graph of FIG. 7A in accordance with one or more embodiments. The triangle including edges 713, 717, and 715 and vertices B, C, and D is usable to represent the triangle including edges 716, 717, and 715 and vertices C, D, and E without affecting the result of N-coloring of the conflict graph 700A. Thereafter, once the N-coloring result of the combined vertex B/E is determined, the coloring result of vertices B and E is determined.

Figure 7C:
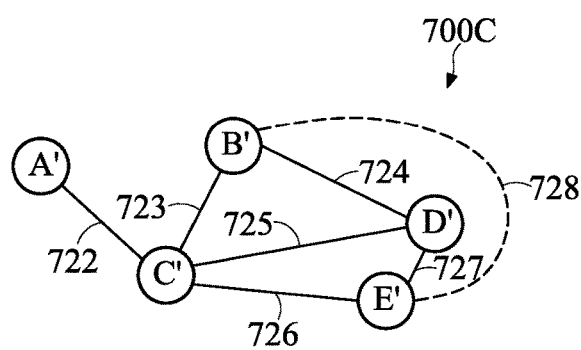
FIG. 7C is a conflict graph in accordance with one or more embodiments.
Figure 7D:
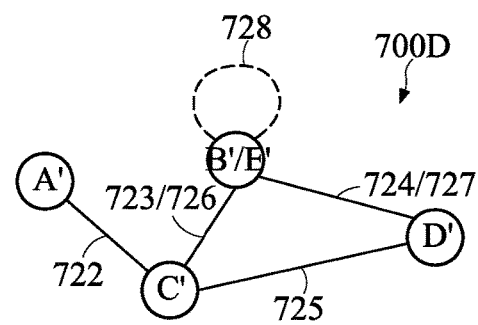
FIG. 7D is a resulting conflict graph after performing diamond reduction on the conflict graph of FIG. 7C in accordance with one or more embodiments.

FIG. 7C is a conflict graph 700C in accordance with one or more embodiments. Conflict graph 700C depicts that vertex A' is connected to vertex C' by edge 722, vertex B' is connected to vertices C' by edge 723, D' by edge 724, and E' by edge 728, vertex E' is further connected to vertices C' by edge 726 and D' by edge 727, and vertex C' is also connected to vertex D' by edge 725. FIG. 7D is a resulting conflict graph 700D after performing diamond reduction on the conflict graph 700C of FIG. 7C in accordance with one or more embodiments. The triangle including edges 723, 724, and 725 and vertices B', C', and D' is used to represent the triangle including edges 726, 727, and 725 and vertices C', D', and E' according to a method illustrated in conjunction with FIGS. 7A and 7B. The combined vertex B'/E' causes the edge 728 to form a loop. A loop in a resulting conflict graph after performing diamond reduction denotes that the vertices corresponding to the combined vertex on which the loop is associated, such as vertices B' and E' in this example, cannot be colored by the same color. Accordingly, there is a coloring conflict at the combined vertex B'/E'. Conflict graph 700C is thus not 3-colorable.

Method of Determining if Layout Design is N-Colorable

Figure 8:
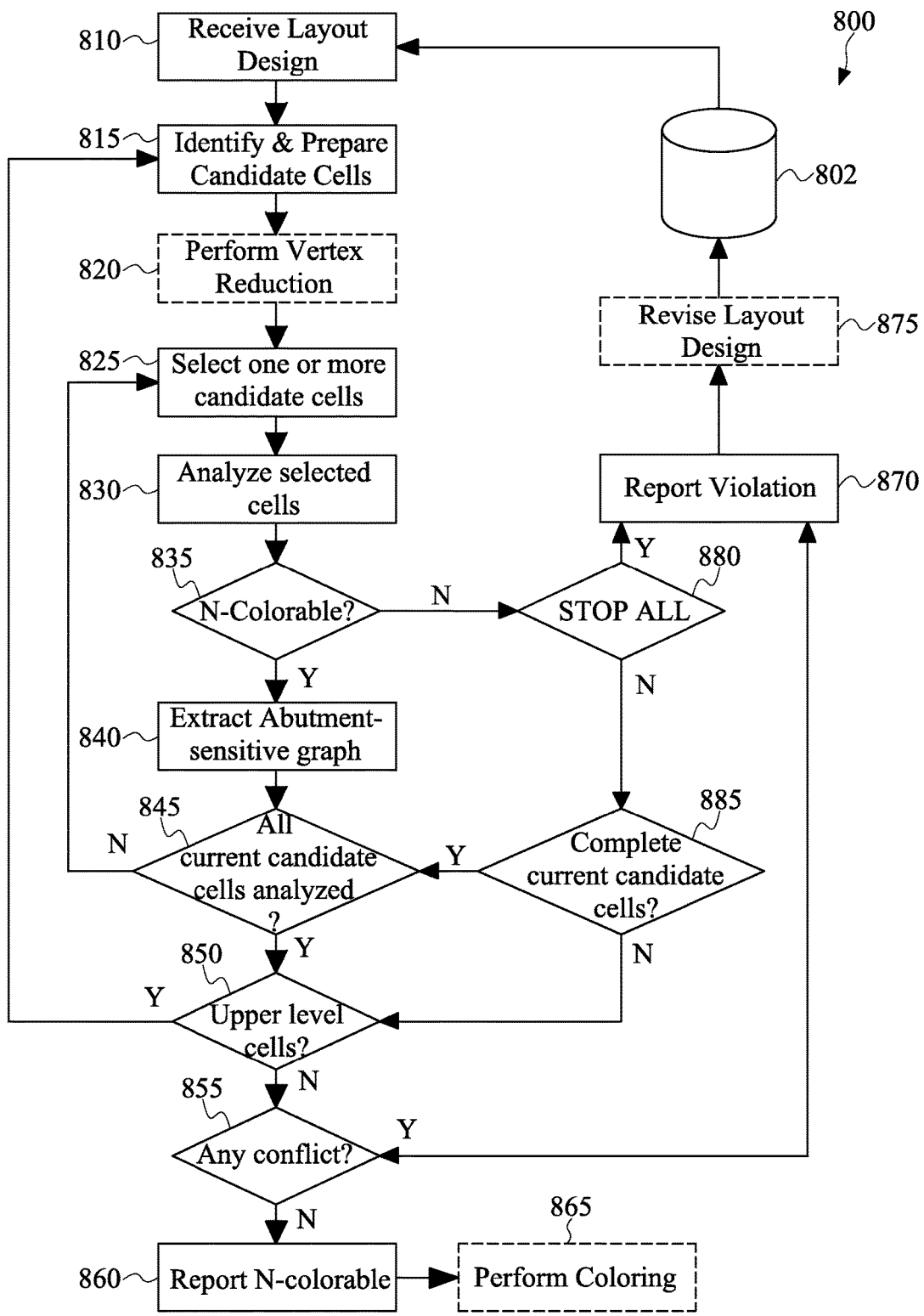
FIG. 8 is a flowchart of a method of determining if a layout design is N-colorable in accordance with one or more embodiments.

FIG. 8 is a flowchart of a method 800 of determining if a layout design 802, e.g., a layout design represented by top layout cell 152 in FIG. 1, is N-colorable in accordance with one or more embodiments. It is understood that additional operations may be performed before, during, and/or after the method 800 depicted in FIG. 8, and that some other processes may only be briefly described herein. In some embodiments, the method is a set of instructions 914a performed by a hardware processing unit 912 depicted in FIG. 9.

In operation 810, a layout design 802 for fabricating a layer of features of an integrated circuit is received. As depicted in FIG. 1, in some embodiments, layout design 802 includes a top layout cell 152 and a plurality of layout cells 112, 113, 114, 116, 117, 118, 122, 124, 126, 128, 132, 134, 136, and 142 arranged in a hierarchical manner In some embodiments, layout design 802 is stored in a non-transitory storage device, such as storage medium 914 in FIG. 9, in a database file format, e.g., GRAPHIC DATA SYSTEM (GDS II), OPEN ARTWORK SYSTEM INTERCHANGE STANDARD (OASIS), or other suitable formats. In some embodiments, layout design 802 includes information regarding layout cells, e.g. layout cells 112, 113, 114, 116, 117, 118, 122, 124, 126, 128, 132, 134, 136, 142, and 152, of the layout design 802 and how the layout cells are arranged hierarchically. In some embodiments, layout design 802 includes a set of base layout cells 112, 113, 114, 116, 117, and 118 and a set of composite layout cells 122, 124, 126, 128, 132, 134, 136, 142, and 152, and the set of composite layout cells includes a top layout cell 152 that represents the layout design itself.

As depicted in FIG. 8, in operation 815, a set of candidate cells among the layout cells are identified. A candidate cell for method 800 is defined as one of the set of base layout cells, e.g., layout cells 112, 113, 114, 116, 117, and 118, or one of the set of composite layout cells, e.g., layout cells 122, 124, 126, 128, 132, 134, 136, 142, and 152. In some embodiments, in order to benefit from abutment-sensitive conflict graphs of layout cells from lower hierarchical levels, if the candidate cell is a composite layout cell, constituent layout cells thereof have been determined as N-colorable. However, whether the candidate cell is N-colorable has not yet been determined at this stage.

After identifying the set of candidate cells, conflict graphs for corresponding ones of the identified layout cells are prepared.

In some embodiments, in operation 815, base layout cell, e.g., layout cell 200 in FIG. 2A, is identified as a candidate cell because layout cell 200 is a base layout cell and whether layout cell 200 is N-colorable has not yet been determined. In some embodiments, a conflict graph 240 as depicted in FIG. 2B is prepared according to the processes illustrated in conjunction with FIGS. 2A and 2B.

In some embodiments, in operation 815, a composite layout cell, e.g., layout cell depicted in FIG. 5C, is identified as a candidate cell when abutment-sensitive conflict graphs for constituent layout cell thereof have been determined as N-colorable. Preparation of a conflict graph for a composite layout cell depends on abutment-sensitive conflict graphs of constituent layout cells thereof. In some embodiments, a conflict graph 540 as depicted in FIG. 5C is prepared according to the processes illustrated in conjunction with FIGS. 5A-5C. Therefore, in some embodiments, operation 815 further includes generating conflict graph 540 according to abutment-sensitive conflict graphs of cells 552, 554, 556, and 558.

In operation 820, complexity of the conflict graphs of identified candidate cells is reduced by performing a vertex reduction process. Many vertex reduction processes are applicable to determine which vertex is omissible in order to simplify the conflict graph to be analyzed in operation 830. In some embodiments, vertex reduction is performed based on the process illustrated in conjunction with FIGS. 6A-6C.

In some embodiments, operation 820 is omitted. In some embodiments, operation 820 is performed during performing operation 830, which will be further explained later.

In operation 825, one or more candidate cells are selected from the pool of identified candidate cells. For example, if base layout cells 112, 113, 114, 116, 117, and 118 are currently identified as candidate cells, one or more of layout cells 112, 113, 114, 116, 117, and 118 are selected for analyzing whether these layout cells are N-colorable. In some embodiments, two or more candidate cells are selected to be analyzed in a parallel processing manner. In some embodiments, parallel processing refers to one or more processors performing multiple analyses by multitasking or multithreading. In some embodiments, parallel processing refers to a plurality of processors each assigned to perform a corresponding one of multiple analyses at the same time. In some embodiments, candidate cells are selected randomly or according to one or more factors including a frequency of a layout cell being used by other higher level layout cells, a cell size, a total number of edges in a conflict graph, or a number of abutting cells.

In operation 830, an analysis is performed to determine if a selected candidate cell is N-colorable. There are many applicable algorithms for determining if a candidate cell is N-colorable. In some embodiments, operation 830 includes establishing a truth table to enumerate possible combinations of coloring vertices and identifying one or more solutions (i.e., no neighboring vertices has the same color) among the enumerated combinations. In some embodiments, when N is set to be three, operation 830 includes performing a diamond reduction as illustrated in conjunction with FIGS. 7A-7D in order to determine if a conflict of coloring exists.

As depicted in FIGS. 4A-4D, two or more possible abutment-sensitive conflict graphs 440 and 460 are derivable from the same conflict graph 430. In some embodiments, each alternative abutment-sensitive conflict graph 440 or 460 is consistent with a sub-set of an entire solution space of conflict graph 430. In some embodiments, in operation 825, only one of abutment-sensitive conflict graphs 440 and 460 is selected for performing analysis in operation 830. In some embodiments, if one of alternative abutment-sensitive conflict graphs, e.g., abutment-sensitive conflict graph 440, is analyzed and causes a layout cell depending from abutment-sensitive conflict graph 440 to be not N-colorable, another alternative abutment-sensitive conflict graph, e.g., abutment-sensitive conflict graph 460, is analyzed instead. In some embodiments, instead of selecting one of alternative abutment-sensitive conflict graphs, a modified abutment conflict graph, e.g., conflict graph 480, which is consistent with the entire solution space of conflict graph 430 is selected in operation 825 for operation 830.

After analyzing the conflict graph of a selected candidate cell, in operation 835, it is determined if the analyzed candidate cell is N-colorable. If the analyzed candidate cell is N-colorable, the method proceeds to operation 840 to extract abutment-sensitive information for the candidate cell. Otherwise, the method proceeds to operation 880, which will be further illustrated below.

In some embodiments, the abutment-sensitive information is prepared in the format of an abutment sensitive conflict graph, such as abutment-sensitive conflict graphs 350, 440, 460, or 480. An abutment sensitive conflict graph includes a subset of vertices of the candidate cell, one or more same-color links, or one or more different color links. In some embodiments, if none of the layout patterns of the candidate cell will affect other cells abutting the candidate cell, the abutment sensitive conflict graph of the candidate cell includes no vertices, no same color links, and no different-color links. In some embodiments, the preparation of a abutment-sensitive conflict graph is based on the process as illustrated in conjunction with FIGS. 3A-3B and 4A-4E.

In some embodiments, operation 840 is omitted if the layout cell currently being processed is a top layout cell, e.g., top layout cell 152. In some embodiments, operation 840 is still performed for top layout cell, because the extracted abutment-sensitive conflict graph for the top layout cell is still usable when designing yet another integrated circuit using the current integrated circuit as a building block. For example, in some embodiments, layout cell 142 is a top cell of another integrated circuit design. Therefore, if the abutment-sensitive layout cell of layout cell 142 has been derived when analyzing another integrated circuit design (where layout cell 142 is the top cell thereof), the abutment-sensitive layout cell of layout cell 142 from the another integrated circuit design is usable when analyzing top cell 152.

In some embodiments, two or more candidate cells are selected in operation 825 to be analyzed in parallel. In at least one embodiment, an individual set of operations 830, 835, and 840 is performed for each selected candidate cell in parallel.

After extracting a corresponding abutment-sensitive conflict graph in operation 840, the method proceeds to operation 845 to determine if all currently identified candidate cells are analyzed. If all currently identified candidate cells have been analyzed, the method proceeds to operation 850. Otherwise, the method proceeds to operation 825 to select one or more candidate cells that has not been analyzed.

In operation 850, it is determined if all layout cells having higher hierarchical levels than currently identified candidate cells have been processed by operation 815. If a currently analyzed candidate cell is determined to be N-colorable, a higher level cell referring to the currently analyzed candidate cell will be checked again in operation 815. If there is no more layout cell having a higher hierarchical level than currently identified candidate cells, the method proceeds to operation 855.

In some embodiments, operations 815 through 850 are repetitively performed in an iterative manner until all layout cells of the layout design are processed.

In operation 855, after all layout cells of the received layout design, such as layout cells 112, 113, 114, 116, 117, 118, 122, 124, 126, 128, 132, 134, 136, 142, and 152 of a layout design represented by top layout cell 152, are analyzed, it is determined if there is any coloring conflict for N-coloring. If there is no coloring conflict and the top cell is N-colorable, the method proceeds to operation 860 to report that the layout design is N-colorable when it is determined that the top cell is N-colorable. After it is reported that the layout design is N-colorable, the method optionally proceeds to operation 865 to perform coloring of the layout design.

In some embodiments, operation 865 includes coloring vertices of a conflict graph of a top layout cell 152 first. After completion of coloring the vertices of the conflict graph of the top layout cell 152, conflict graphs of constituent layout cells thereof, e.g., layout cells 142, 136-1, and 136-2, with regard to vertices within corresponding blockage boundaries 320, 420, 512, or 532 are "promoted," i.e., brought up from the lower levels and merged with the conflict graph of the top layout cell 152. Then, the promotion of conflict graphs of corresponding constituent layout cells of a layout cell is performed in an iterative manner until conflict graphs of the layout cells of the layout design are merged and colored.

For example, for a layout cell depicted in FIG. 5C having a higher hierarchical level than layout cells 552, 554, 556, and 558, colors of vertices F1, G1, H1, J1, F2, G2, H2, J2, K1, O1, K2, and O2 of the corresponding conflict graph 540 are determined, and then conflict graphs of constituent layout cells thereof (e.g., layout cells 552, 554, 556, and 558) with regard to vertices within corresponding blockage boundaries (corresponding vertex I for layout cells 552 and 554 and corresponding vertices L, M, N for layout cells 556 and 558) are promoted to be merged with the conflict graph 540 of the higher level layout cell. This coloring method is also referred to as "bubble coloring method," because lower level conflict graphs are promoted to be merged with an upper level conflict graph one level at a time in an iterative manner.

On the other hand, if there is any coloring conflict in any of the layout cell, the method proceeds to operation 870 to report that the layout design is not N-colorable. After it is reported that the layout design is not N-colorable, the method proceeds to operation 875, where a circuit designer or a layout engineer revises the layout design 802 accordingly. In some embodiments, operation 875 is omitted, and the layout design 802 is marked as not N-colorable.

Also, back in operation 835, if the analyzed candidate cell is not N-colorable, the method proceeds to operation 880. In operation 880, if the method is set to perform in a way that all analysis are stopped whenever there is a conflict found at operation 830, the method proceeds to operation 870 to report that the layout design is not N-colorable. However, if the method is not set to stop all analysis in operation 880, the method proceeds to operation 885.

In operation 885, if the method is set to continue analyzing other identified candidate cells, the method proceeds to operation 845. If the method is set to skip analyzing other identified candidate cells, the method proceeds to operation 850.

Figure 9:
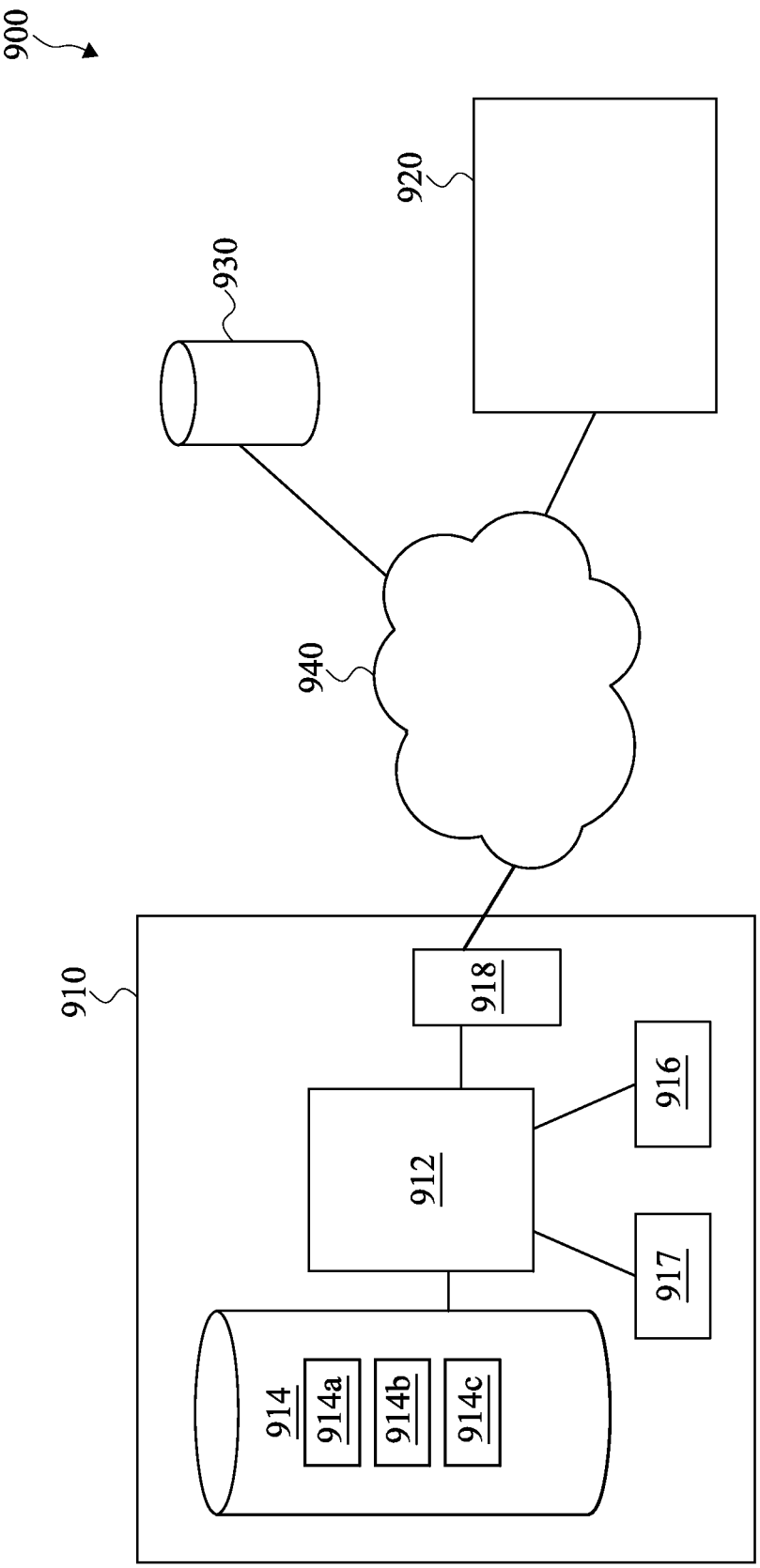
FIG. 9 is a functional block diagram of an integrated circuit designing system in accordance with one or more embodiments.

FIG. 9 is a functional block diagram of an integrated circuit designing system 900 in accordance with one or more embodiments. Integrated circuit designing system 900 includes a first computer system 910, a second computer system 920, a networked storage device 930, and a network 940 connecting the first computer system 910, the second computer system 920, and the networked storage device 930. In some embodiments, one or more of the second computer system 920, the storage device 930, and the network 940 are omitted.

The first computer system 910 includes a hardware processing unit 912 communicatively coupled with a non-transitory, computer readable storage medium 914 encoded with, i.e., storing, a set of instructions 914a, a layout design 914b (e.g., element 802 in FIG. 8), or any intermediate data for storing conflict graph or abutment-sensitive conflict graphs 914c. The processing unit 912 is electrically and communicatively coupled with the computer readable storage medium 914. The processing unit 912 is configured to execute the set of instructions 914a encoded in the computer readable storage medium 914 in order to cause the computer 910 to be usable as a circuit designing tool for performing an N-coloring analysis as described in conjunction with FIG. 8.

In some embodiments, the set of instructions 914a, the layout design 914b, or the intermediate data 914c are stored in a non-transitory storage medium other than storage medium 914. In some embodiments, some or all of the set of instructions 914a, the layout design 914b, or the intermediate data 914c are stored in a non-transitory storage medium in networked storage device 930 or second computer system 920. In such case, some or all of the set of instructions 914a, the layout design 914b, or the intermediate data 914c stored outside computer 910 is accessible by the processing unit 912 through the network 940.

In some embodiments, the processing unit 912 is a central processing unit (CPU), a multi-processor, a distributed processing system, an application specific integrated circuit (ASIC), and/or a suitable processing unit.

In some embodiments, the computer readable storage medium 914 is an electronic, magnetic, optical, electromagnetic, infrared, and/or a semiconductor system (or apparatus or device). For example, the computer readable storage medium 914 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 914 includes a compact disk-read only memory (CD-ROM), a compact disk-read/write (CD-R/W), and/or a digital video disc (DVD).

The computer system 910 includes, in at least some embodiments, an input/output interface 916 and a display unit 917. The input/output interface 916 is coupled to the processing unit 912 and allows the circuit designer to manipulate the first computer system 910. In at least some embodiments, the display unit 917 displays the status of executing the set of instructions 914a in a real-time manner and preferably provides a Graphical User Interface (GUI). In at least some embodiments, the input/output interface 916 and the display 917 allow an operator to operate the computer system 910 in an interactive manner.

In at least some embodiments, the computer system 900 also includes a network interface 918 coupled to the processing unit 912. The network interface 918 allows the computer system 910 to communicate with the network 940, to which one or more other computer systems are connected. The network interface includes wireless network interfaces such as BLUETOOTH, WIFI, WIMAX, GPRS, or WCDMA; or wired network interface such as ETHERNET, USB, or IEEE-1394.

In accordance with one embodiment, a method of determining if a layout design for fabricating a layer of features of an integrated circuit is N-colorable, comprising identifying a set of candidate cells among layout cells of a layout design. Each candidate cell of the set of candidate cells is one of the set of base layout cells, or one of the set of composite layout cells, and constituent layout cells of the one of the set of composite layout cells having been determined as N-colorable. Whether a first candidate cell of the set of candidate cell is N-colorable is determined. An abutment-sensitive conflict graph of the first candidate cell is generated when the first candidate cell is N-colorable and the first candidate cell is not the top layout cell.

In accordance with another embodiment, an integrated circuit designing system includes a non-transitory storage medium encoded with a set of instructions and a hardware processing unit communicatively coupled with the non-transitory storage medium. The hardware processing unit is configured to execute the set of instruction to identify a set of candidate cells among layout cells of a layout design for fabricating a layer of features of an integrated circuit; to determine if a first candidate cell of the set of candidate cell is N-colorable; and to generate an abutment-sensitive conflict graph of the first candidate cell when the first candidate cell is N-colorable and the first candidate cell is not a top layout cell, the top layout cell being the layout design itself. Each candidate cell of the set of candidate cells is one of a set of base layout cells, or one of a set of composite layout cells, and constituent layout cells of the one of a set of composite layout cells having been determined as N-colorable.

In accordance with another embodiment, a non-transitory storage medium encoded with a set of instructions. The set of instructions are configured to cause a hardware processing unit to perform a method including identifying a set of candidate cells among layout cells of a layout design for fabricating a layer of features of an integrated circuit; determining if a first candidate cell of the set of candidate cell is N-colorable; and generating an abutment-sensitive conflict graph of the first candidate cell when the first candidate cell is N-colorable and the first candidate cell is not a top layout cell, the top layout cell being the layout design itself. Each candidate cell of the set of candidate cells is one of a set of base layout cells, or one of a set of composite layout cells, and constituent layout cells of the one of a set of composite layout cells having been determined as N-colorable.

The foregoing describes features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of determining if a layout design for fabricating a layer of features of an integrated circuit is N-colorable, N being a positive integer no less than 2, the layout design comprising layout cells arranged in a hierarchical manner, the layout cells comprising a set of base layout cells and a set of composite layout cells, the set of composite layout cells comprising a top layout cell, the top layout cell representing the layout design, and the method comprising:
   identifying a set of candidate cells among the layout cells, each candidate cell of the set of candidate cells being one of the set of base layout cells, or one of the set of composite layout cells, and constituent layout cells of the set of composite layout cells having been determined as N-colorable;
   performing vertex reduction on a first candidate cell of the set of candidate cells, wherein the first candidate cell includes one or more layout patterns corresponding to one or more vertices;
   determining if the first candidate cell of the set of candidate cells is N-colorable;
   generating, by a hardware processing unit, an abutment-sensitive conflict graph of the first candidate cell when the first candidate cell is N-colorable and the first candidate cell is not the top layout cell, wherein
      the abutment-sensitive conflict graph includes a set of vertices, wherein each respective vertex of the set of vertices corresponds to a respective pattern of the first candidate cell,
      an abutment-sensitive region is defined between a cell boundary of the first candidate cell and a blockage boundary of the first candidate cell,
      the blockage boundary is defined in the abutment-sensitive conflict graph by a distance inward from the cell boundary of the first candidate cell, and at least one vertex not falling in the abutment-sensitive region is separately N-colorable,
      generating the abutment-sensitive conflict graph further comprises:
         generating a set of abutment vertices, wherein each abutment vertex of the set of abutment vertices falls in the abutment-sensitive region of the abutment-sensitive conflict graph; and
         including another vertex in the abutment-sensitive conflict graph in response to the abutment-sensitive conflict graph having two or more different configurations prior to the inclusion of the another vertex, the another vertex corresponding to the at least one vertex that is outside the abutment-sensitive region, and each configuration of the two or more different configurations has the set of abutment vertices linked in a manner different from other configurations of the two or more different configurations, and
   wherein at least one of the identifying, the determining, or the generating are repetitively performed in an iterative manner until a top, N-colorable, layout design is obtained; and
   fabricating a layer of the integrated circuit based on the top, N-colorable, layout design.

2. The method of claim 1, further comprising:
   reporting that the layout design is N-colorable when the top layout cell is N-colorable; and
   reporting that the layout design is not N-colorable when any of the layout cells is not N-colorable.

3. The method of claim 1, further comprising determining if a second candidate cell of the set of candidate cell is N-colorable, wherein the determining if the first candidate cell is N-colorable and the determining if the second candidate cell is N-colorable are processed in a parallel processing manner.

4. The method of claim 1, wherein the generating the abutment-sensitive conflict graph of the first candidate cell further comprises connecting two vertices of the set of vertices by a different-color link when the two vertices are capable of being assigned to different colors.

5. The method of claim 1, wherein the distance is equal to or greater than a summation of a predetermined threshold distance and a predetermined cell-overlapping allowance.

6. The method of claim 1, wherein the first candidate cell comprises a combination of the constituent layout cells, and the method further comprises:

generating a conflict graph of the first candidate cell according to abutment-sensitive conflict graphs of the constituent layout cells of the first candidate cell.

7. The method of claim 6, wherein the generating the conflict graph of the first candidate comprises:
connecting two vertices by a different-color link when the two vertices are variously from corresponding abutting-sensitive conflict graphs of two adjacent layout cells of the constituent layout cells; and layout patterns represented by the two vertices have a distance less than a predetermined threshold distance.

8. The method of claim 6, further comprising:
removing one or more omissible vertices from the conflict graph of the first candidate cell.

9. The method of claim 8, wherein the removing the one or more vertices from the conflict graph of the first candidate cell comprises:
removing one of the one or more omissible vertices from the conflict graph of the first candidate cell when the one of the one or more omissible vertices is connected to equal to or less than (N−1) vertices in the conflict graph of the first candidate cell.

10. The method of claim 1, further comprising performing N-coloring on the layout design after a determination that the top layout cell is N-colorable.

11. The method of claim 10, wherein the performing N-coloring on the layout design comprises:
performing a coloring operation to color vertices of a conflict graph of one of the layout cells; and
performing a merging operation to merge conflict graphs of constituent layout cells of the one of the layout cells with the conflict graph of the one of the layout cells after the coloring operation, the coloring operation and the merging operation being performed in an iterative manner starting from the top layout cell until conflict graphs of the layout cells are merged and colored.

12. The method of claim 1, further comprising combining two vertices of the set of vertices which must have a same color into a single vertex, wherein the combining of the two vertices comprises maintaining separation between layout patterns of the one or more layout patterns corresponding to the two vertices.

13. An integrated circuit designing system, comprising:
a non-transitory storage medium encoded with a set of instructions; and
a hardware processing unit communicatively coupled with the non-transitory storage medium and configured to execute the set of instructions to:
identify a set of candidate cells among layout cells of a layout design for fabricating a layer of features of an integrated circuit, each candidate cell of the set of candidate cells being one of a set of base layout cells, or one of a set of composite layout cells, and constituent layout cells of the set of composite layout cells having been determined as N-colorable;
perform vertex reduction on a first candidate cell of the set of candidate cells, wherein the first candidate cell includes one or more layout patterns corresponding to one or more vertices;
determine if the first candidate cell of the set of candidate cells is N-colorable, wherein the first candidate cell includes one or more layout patterns;
generate an abutment-sensitive conflict graph of the first candidate cell when the first candidate cell is N-colorable and the first candidate cell is not a top layout cell, the top layout cell being the layout design, wherein the abutment-sensitive conflict graph includes a set of vertices, wherein each respective vertex of the set of vertices corresponds to a respective pattern of the first candidate cell, an abutment-sensitive region is defined between a cell boundary of the first candidate cell and a blockage boundary of the first candidate cell, the blockage boundary is defined in the abutment-sensitive conflict graph by a distance inward from the cell boundary of the first candidate cell, and at least one vertex not falling in the abutment-sensitive region is separately N-colorable;
generate a set of abutment vertices, wherein each abutment vertex of the set of abutment vertices falls in the abutment-sensitive region of the abutment-sensitive conflict graph;
combine two vertices of the set of vertices into a single vertex when the two vertices are required to be assigned to a same color, wherein the combining of the two vertices comprises maintaining separation between layout patterns of the one or more layout patterns corresponding to the two vertices; and
include another vertex in the abutment-sensitive conflict graph in response to the abutment-sensitive conflict graph having two or more different configurations prior to the inclusion of the another vertex, the another vertex corresponding to the at least one vertex that is outside the abutment-sensitive region, and each configuration of the two or more different configurations has the set of abutment vertices linked in a manner different from other configurations of the two or more different configurations,
wherein the hardware processing unit is configured to repetitively perform the identifying, the determining, and the generating in an iterative manner until a top, N-colorable, layout design is obtained; and
providing instructions to at least one device for a fabrication process for fabricating a layer of the integrated circuit based on the top, N-colorable, layout design.

14. The integrated circuit designing system of claim 13, wherein the hardware processing unit is configured to further determine if a second candidate cell of the set of candidate cell is N-colorable, wherein the determining if the first candidate cell is N-colorable and the determining if the second candidate cell is N-colorable are processed in a parallel processing manner.

15. The integrated circuit designing system of claim 13, wherein the hardware processing unit, when executing the set of instructions to generate the abutment-sensitive conflict graph of the first candidate cell, is further configured to connect two vertices of the set of vertices by a different-color link when the two vertices are capable of being assigned to different colors.

16. The integrated circuit designing system of claim 13, wherein the hardware processing unit, when executing the set of instructions, is further configured to:
generate a conflict graph of the first candidate cell according to abutment-sensitive conflict graphs of the constituent layout cells of the first candidate cell when the first candidate cell comprises a combination of the constituent layout cells.

17. The integrated circuit designing system of claim 13, wherein the hardware processing unit, when executing the set of instructions, is further configured to:
perform a coloring operation to color vertices of a conflict graph of one of the layout cells; and
perform a merging operation to merge conflict graphs of constituent layout cells of the one of the layout cells with the conflict graph of the one of the layout cells after the coloring operation;

wherein the coloring operation and the merging operation are performed in an iterative manner starting from the top layout cell until conflict graphs of the layout cells are merged and colored.

18. A non-transitory storage medium encoded with a set of instructions, the set of instructions configured to cause a hardware processing unit to perform a method comprising:

identifying a set of candidate cells among layout cells of a layout design for fabricating a layer of features of an integrated circuit, each candidate cell of the set of candidate cells being one of a set of base layout cells, or one of a set of composite layout cells, and constituent layout cells of the set of composite layout cells having been determined as N-colorable;

performing vertex reduction on a first candidate cell of the set of candidate cells, wherein the first candidate cell includes one or more layout patterns corresponding to one or more vertices;

determining if the first candidate cell of the set of candidate cells is N-colorable, wherein the determining if the first candidate cell is N-colorable comprises:

defining a set of vertices, where each respective vertex of the set of vertices corresponds to a respective pattern of the first candidate cell, combining two vertices of the set of vertices into a single vertex in response to the two vertices being required to be a same color, wherein the combining of the two vertices comprises maintaining separation between respective patterns of the two vertices, and determining whether a coloring conflict exists between the two combined vertices;

generating an abutment-sensitive conflict graph of the first candidate cell when the first candidate cell is N-colorable and the first candidate cell is not a top layout cell, the top layout cell being the layout design, wherein the abutment-sensitive conflict graph includes:

an abutment-sensitive region defined between a cell boundary of the first candidate cell and a blockage boundary of the first candidate cell, the blockage boundary is defined in the abutment-sensitive conflict graph by a distance inward from the cell boundary of the first candidate cell, and at least one vertex not falling in the abutment-sensitive region is separately N-colorable, and the generating the abutment-sensitive conflict graph of the first candidate cell comprises:

generating a set of abutment vertices, wherein each abutment vertex of the set of abutment vertices falls in the abutment-sensitive region of the abutment-sensitive conflict graph, and including another vertex in the abutment-sensitive conflict graph in response to the abutment-sensitive conflict graph having two or more different configurations prior to the inclusion of the another vertex, the another vertex corresponding to the at least one vertex that is outside the abutment-sensitive region, and each configuration of the two or more different configurations has the set of abutment vertices linked in a manner different from other configurations of the two or more different configurations;

connecting two vertices of the set of vertices by a same-color link when the two vertices are capable of being assigned to a same color;

repetitively performing the identifying, the determining, and the generating in an iterative manner until a top, N-colorable, layout design is obtained; and providing instructions to at least one device for a fabrication process for fabricating a layer of the integrated circuit based on the top, N-colorable, layout design.

19. The non-transitory storage medium of claim 18, wherein the set of instructions are configured to cause the hardware processing unit to further determine if a second candidate cell of the set of candidate cell is N-colorable, wherein the determining if the first candidate cell is N-colorable and the determining if the second candidate cell is N-colorable are processed in a parallel processing manner.

20. The non-transitory storage medium of claim 18, wherein the generating the abutment-sensitive conflict graph of the first candidate cell further comprises connecting two vertices of the set of vertices by a different-color link when the two vertices are capable of being assigned to different colors.

21. The non-transitory storage medium of claim 18, wherein the set of instructions are configured to cause the hardware processing unit to:

perform a coloring operation to color vertices of a conflict graph of one of the layout cells; and perform a merging operation to merge conflict graphs of constituent layout cells of the one of the layout cells with the conflict graph of the one of the layout cells after the coloring operation, wherein the coloring operation and the merging operation are performed in an iterative manner starting from the top layout cell until conflict graphs of the layout cells are merged and colored.

* * * * *